April 1, 1930.  E. A. BOLINDER  1,752,586
SAW BLADE
Filed Oct. 8, 1928
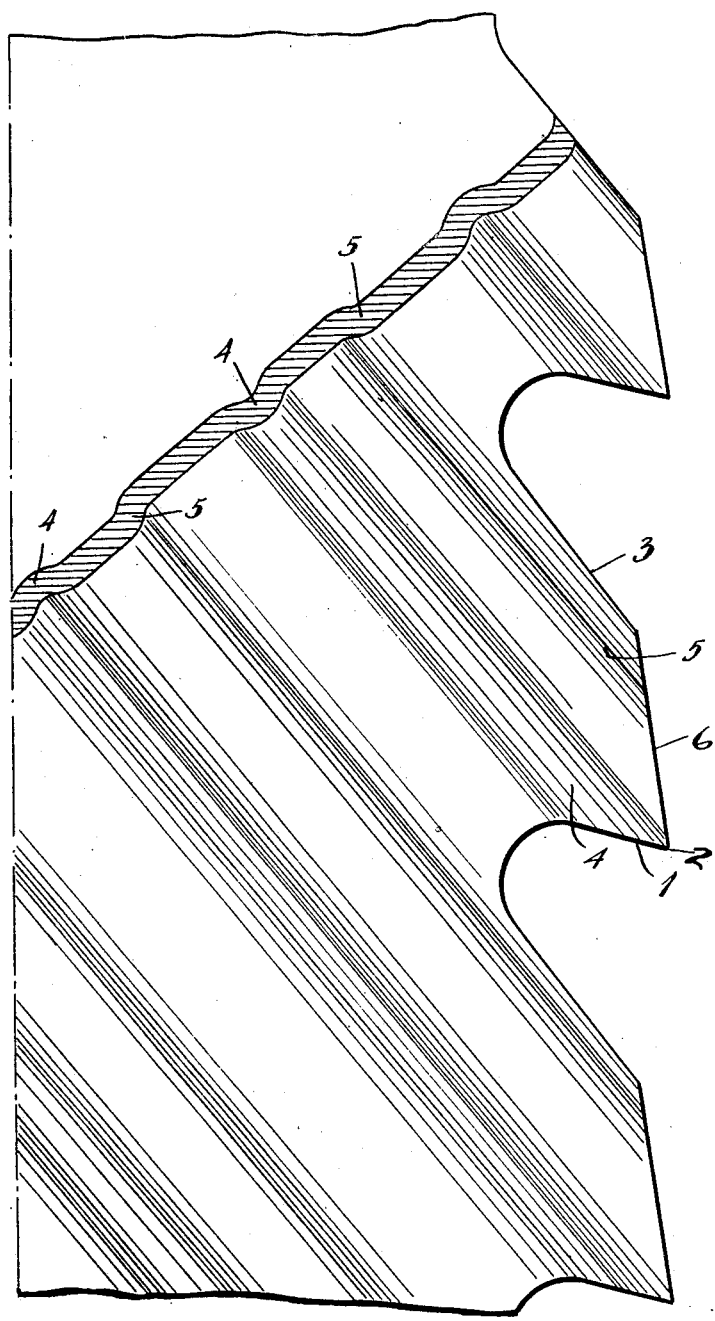
E. A. Bolinder
INVENTOR
By Marks & Clark
ATTYS.

Patented Apr. 1, 1930

1,752,586

UNITED STATES PATENT OFFICE

ERIK AUGUST BOLINDER, OF STOCKHOLM, SWEDEN

SAW BLADE

Application filed October 8, 1928, Serial No. 311,207, and in Sweden February 25, 1928.

When sawing timber to form boards and battens it is of great importance for economic purposes that the loss through cutting be as small as possible, and inasmuch as the loss is directly dependent on the thickness of the blade and also on the setting of the teeth of the saw, it is desirable to use very thin saw blades with a minimum amount of setting. Hitherto, this could not be accomplished satisfactorily for the reason that when a thin blade with a small setting was used the setting was not permanent owing to the fact that the thin bladed teeth could not be given the rigidity required to maintain the setting when the teeth were subjected to lateral strains during sawing. In such circumstances the benefit of the thin blade was nullified.

The present invention has been made with the above-mentioned experience in mind, and the invention provides for such an arrangement that the saw blade may be made exceedingly thin and still so rigid in its entirety that the setting of the blade teeth will be permanent even if the setting is made as slight as possible. As has been shown by experience, facilities are thus provided for sawing with very thin cuts, that is to say with a very small cut loss. The problem is thus solved in a satisfactory and, for practical applications, advantageous manner.

The arrangement provided according to the invention is principally characterized by the saw blade being provided with corrugations extending obliquely over the same, said corrugations having such a position and such an extension relatively to the blade teeth that one or more of the corrugations will extend along the lateral surface of each tooth and, furthermore, in such a manner that one of the corrugations at least will terminate at the fore edge of the tooth or in or near the point of the tooth, said corrugation then imparting to the pointed portion of the tooth, the rigidity required to maintain the setting.

The arrangement thus provided according to the invention entails a further advantage of the greatest importance, involving that the thin saw blade when stretched in a blade frame obtains the requisite rigidness against bending strains both laterally and longitudinally, that is to say in the direction of the stretching of the blade, and also in a direction at right angles thereto.

The accompanying drawing illustrates an embodiment of the invention and shows a portion of a saw blade viewed in elevation with a part broken away so as to show a cross section.

According to the invention, 1 designates the fore edge, 2 the point, 6 the outer edge, and 3 the rear edge of each blade tooth. According to the example shown, each tooth coincides with two blade corrugations 4 and 5 arranged according to the invention, said corrugations extending obliquely over the blade and parallel with each other and, preferably, also parallel to the rear edge 3 of the tooth. The front corrugation 4 terminates at the fore edge 1 of the tooth and at or in the proximity of the tooth point 2. The rear corrugation 5 terminates in the outwardly directed edge 6 of the tooth and coincides, or approximately coincides with the rear tooth edge 3.

The corrugations thus provided are arranged at each other tooth in such a manner as to form elevations on the one side of the saw blade, whereas at the adjacent tooth they form elevations on the opposite side of the blade.

The setting is effected with the tooth points deviating toward that side of the blade on which the respective corrugations form elevations, and from the statements hereinbefore as well as from the drawing it will be readily understood that the corrugations will then offer a great resistance to the active lateral pressure on the teeth in the sawing operation, so that the setting, despite the extreme thinness of the blade, will nevertheless be maintained in a safe manner.

With the blade stretched tightly in the blade frame, the corrugations will also prevent bending of the blade either along the blade or in the transverse direction thereto.

By adapting the depth of the corrugations so that they will only be a fraction of the blade thickness, for instance $\frac{1}{5}$ thereof, there will remain, according to this example, $\frac{4}{5}$ of the blade thickness inside the bottoms of the corrugations, whereby the blade may be subjected to a powerful tensile stress, without the corrugations thereof being deformed in consequence of the strain.

What I claim is:—

1. In a saw, a blade provided with corrugations extending across the blade throughout the width thereof, at least two of such corrugations extending to the lateral surfaces of each tooth of the blade between the point of the tooth and the rear edge thereof, so that the corrugations will impart to each tooth a rigidness laterally that even with thin saw blades the setting of the teeth will remain against the influence of lateral pressure acting on the teeth.

2. A saw blade as claimed in claim 1, characterized by the fact that two adjacent and mutually parallel corrugations coincide with each tooth, one of which corrugations terminating at the fore edge of the tooth and in the vicinity of the point of the tooth, and the other of said corrugations terminating at the outwardly directed edge of the tooth and substantially coinciding with the rear edge of the tooth.

3. A saw blade arranged according to claim 1, characterized by the depth of the corrugations being only a fraction, for instance $1/5$ of the blade thickness, so that there will remain of the blade thickness between the bottoms of the corrugations, a portion which is capable of withstanding a powerful tensile strain, without this being imparted onto the corrugations to deform the same.

In testimony whereof I affix my signature.

ERIK AUGUST BOLINDER.